(12) United States Patent
El Chami (10) Patent No.: US 10,191,530 B2
(45) Date of Patent: Jan. 29, 2019

(54) SELF-CONTAINED METHOD AND DEVICE FOR MANAGING A FIRST ELECTRONIC APPARATUS

(75) Inventor: Zaher El Chami, Paris (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/983,823

(22) PCT Filed: Feb. 9, 2012

(86) PCT No.: PCT/FR2012/050280
§ 371 (c)(1),
(2), (4) Date: Aug. 6, 2013

(87) PCT Pub. No.: WO2012/168583
PCT Pub. Date: Dec. 13, 2012

(65) Prior Publication Data
US 2013/0318378 A1 Nov. 28, 2013

(30) Foreign Application Priority Data
Feb. 23, 2011 (FR) .................................... 11 51452

(51) Int. Cl.
*G06F 13/38* (2006.01)
*G06F 1/32* (2006.01)
*H04N 5/765* (2006.01)
*H04N 21/4363* (2011.01)
*G06F 3/00* (2006.01)

(52) U.S. Cl.
CPC ........... *G06F 1/3234* (2013.01); *H04N 5/765* (2013.01); *H04N 21/43635* (2013.01)

(58) Field of Classification Search
None
See application file for complete search history.

(56) References Cited

U.S. PATENT DOCUMENTS

| 2007/0097424 | A1* | 5/2007 | Mizuno | G06F 1/3215 358/1.15 |
|---|---|---|---|---|
| 2007/0183786 | A1* | 8/2007 | Hinosugi | H04B 10/40 398/140 |
| 2009/0160868 | A1 | 6/2009 | Yato | |
| 2009/0201421 | A1 | 8/2009 | Mawatari et al. | |
| 2010/0053463 | A1 | 3/2010 | Yeh et al. | |
| 2010/0231795 | A1 | 9/2010 | Choi | |

(Continued)

*Primary Examiner* — Scott C Sun
(74) *Attorney, Agent, or Firm* — Drinker Biddle & Reath LLP (57) ABSTRACT

Disclosed herein is a self-contained method and device for managing a first electronic apparatus. Said first electronic apparatus is, in particular, a first electronic multimedia apparatus connected via an HDMI interface to a second electronic apparatus consisting of a playback apparatus. A self-contained method for managing a first electronic apparatus is provided. The first electronic apparatus is connected to at least one second electronic apparatus such that said first electronic apparatus provides data to the second electronic apparatus, said data being usable by said second electronic apparatus. The self-contained management method comprises a CMD_TRG triggering, by said first electronic apparatus, of a control of said first electronic apparatus, in accordance with activity data da2 of at least one second electronic apparatus from among said second electronic apparatus(es).

20 Claims, 3 Drawing Sheets

(56) References Cited

U.S. PATENT DOCUMENTS

| | | | |
|---|---|---|---|
| 2011/0113122 A1* | 5/2011 | Drope | G06F 17/30017 709/219 |
| 2012/0206418 A1* | 8/2012 | Bi et al. | 345/179 |
| 2012/0239727 A1* | 9/2012 | Dutta | G06F 9/5055 709/203 |

* cited by examiner

SELF-CONTAINED METHOD AND DEVICE FOR MANAGING A FIRST ELECTRONIC APPARATUS

CROSS REFERENCE TO RELATED APPLICATIONS

This application is the U.S. national phase of the International Patent Application No. PCT/FR2012/050280 filed Feb. 9, 2012, which claims the benefit of French Application No. 1151452 filed Feb. 23, 2011, the entire content of which is incorporated herein by reference.

FIELD

The invention relates to a method and a device for autonomous management of a first electronic apparatus. Said first electronic apparatus is, in particular, a first multimedia electronic apparatus connected by an HDMI interface to a second electronic apparatus consisting of a reproduction apparatus.

BACKGROUND

The CEO (Consumer Electronics Control in English) protocol is a protocol allowing two electronic apparatuses to dialogue via an HDMI interface. The CEO protocol makes it possible to create automated strings of commands between several electronic apparatuses connected together. These strings of commands are performed via an HDMI interface available on a "main" electronic apparatus, into which all the electronic apparatuses are directly or indirectly plugged. Thus, the user of these apparatuses will benefit from global control and from a simplification of the system comprising these electronic apparatuses, by reducing the number of useful remote controls.

Thus, the CEO protocol makes it possible to architecture an audio/video system comprising several multimedia apparatuses including apparatuses for multimedia reproduction in a tree-like manner:
  the root being constituted by a multimedia reproduction apparatus, for example, the television,
  the branches by multimedia apparatuses connected to this reproduction apparatuses such as switchers, amps, recorders, etc., and
  the leaves by multimedia apparatuses sourcing multimedia data notably various audio/video sources such as DVD/HD reader, games console, digital terminal, camcorder, etc.

When the user inserts a disk into a reader connected to a reproduction apparatus, and commands the "Reading" of the disk by the reader, the HDMI interface implementing the CEO protocol commands the other multimedia apparatuses connected to the reader and necessary for the reproduction of the disk for the user, namely:
  to command the activation of the television (only if it was on standby) and the toggling of the reproduced port onto the input connected to the reader,
  optionally to command the activation of the amplifier and the toggling of the reproduced port onto the input connected to the reader.

When the user places his television on standby, he often forgets to place on standby the various electronic apparatuses connected to the television such as their decoder or "Set Top Box" (STB). The CEO protocol thus makes it possible, through a simple string of commands, to trigger the placing of the decoder or "Set Top Box" on standby.

The CEO protocol not being implemented in all electronic apparatuses: if the "root" apparatus does not implement the CEO protocol, the latter cannot be used and the user finds himself in a configuration of a system composed of electronic apparatuses that he has to control individually. If the "root" apparatus implements the CEO protocol but the decoder or "Set Top Box" does not implement it, the user can control in a grouped manner the television and the "branch" and "leaf" apparatuses connected to this television implementing the CEO protocol but in an individual manner the decoder or "Set Top Box".

Furthermore, today the constructors of electronic apparatuses are developing proprietary command string protocols for the control of various electronic apparatuses of one and the same electronic system, in particular in the audiovisual (AV) field. Notably, Panasonic's Viera Link protocol, Sony's Bravia Theater Sync protocol, Samsung's Anynet+ protocol, Toshiba's Regza Link protocol or Sharp's Aquos Lonk protocol are proprietary protocols compatible with the HDMI standard affording these command strings as a supplement. Thus, these protocols not necessarily being mutually compatible, and the decoders or "Set Top Box" being rarely, or indeed depending on country, ever manufactured by the constructor of the televisions, the user must generally control his decoder or "Set Top Box" in an individual manner even when his television implements such a proprietary command string protocol.

SUMMARY

One of the aims of the present invention is to remedy drawbacks of the prior art.

A subject of the invention is a method of autonomous management of a first electronic apparatus. The first electronic apparatus is connected to at least one second electronic apparatus in such a way that said first electronic apparatus provides the second electronic apparatus with data able to be used by said second electronic apparatus. The autonomous management method comprises a triggering by said first electronic apparatus of a command of said first electronic apparatus as a function of activity data of at least one second electronic apparatus from among the at least one second electronic apparatus.

Thus, the first electronic apparatus being aware of the activities of a second electronic apparatus can modify its activity accordingly. For example, if the activities data of a second electronic apparatus such as a television indicates that the latter is in "standby" mode, the first electronic apparatus such as a decoder or "Set Top Box" can trigger its own toggling into the "standby" mode.

Advantageously, the command is a command for shutting down at least functional means of said first electronic apparatus.

Thus, the first electronic apparatus toggles into "standby" mode, or into "partial standby" mode when the apparatus comprises several devices that can be placed on standby separately, or into "shutdown" mode. This allows a saving in the energy consumed by the first electronic apparatus, and optionally a reduction in the wear of the devices of the first electronic apparatus, notably of its battery in the case of portable electronic apparatuses such as computers, wireless or mobile telephones, etc.

Advantageously, the triggering is also dependent on activity data of the first electronic apparatus.

Thus, if the television, second electronic apparatus, connected to a "Set Top Box", first electronic apparatus is in "standby" mode but the "Set Top Box" is in the process of updating, there will not be any triggering of command of the "Set Top Box" but if the "Set Top Box" is in "inactive" mode, the autonomous management method will trigger a command for toggling into "standby" mode of the "Set Top Box".

Advantageously, the autonomous management method comprises a detection of an activity of said second electronic apparatus by said first electronic apparatus.

Thus, said detection provides the activity data making it possible optionally to trigger a command of said first electronic apparatus. The first electronic apparatus accordingly detects an activity as a function notably of the exchanges and/or of the data exchanged with the second electronic apparatus, for example received from the second electronic apparatus. The advantage of such a detection as a function of the exchanges and/or data exchanged is that it does not require any compatibility between the first electronic apparatus and the second electronic apparatus not even in the request for activities data and the transmission of these activity data.

Advantageously, the autonomous management method comprises a detection of an activity of said second electronic apparatus by said first electronic apparatus comprising at least one request for statuses from the first electronic apparatus to the second electronic apparatus, said request for statuses being able to trigger a response of the second electronic apparatus to the first electronic apparatus comprising activity data of the second electronic apparatus.

Thus, the second electronic apparatus indicates to the first electronic apparatus its activity, in the form of activity data, on request allowing the first electronic apparatus to trigger a command of said first electronic apparatus. The autonomous management method will be less complex if it requests the second electronic apparatus for its activity than if it has to detect the activity of the second electronic apparatus by itself. Furthermore, the activities data of the second electronic apparatus will then be more reliable.

Advantageously, the autonomous management method comprises a periodic renewal of said detection of an activity.

Thus, the first electronic apparatus can best adapt its activity as soon as the second electronic apparatus changes activity, all the more so as the period is of renewal of the detection of an activity is defined as a function of the type of activity detected.

Advantageously, the detection of an activity of the second electronic apparatus is triggered by a detection of an activity of the first electronic apparatus.

Thus, when the first electronic apparatus toggles into an "inactive" mode of activity, the autonomous management method will verify the activity of the second electronic apparatus so as optionally to trigger a command for toggling into "standby" mode of the first electronic apparatus if the activity data of the second electronic apparatus are notably "standby" or "inactive".

Advantageously, the autonomous management method comprises a time delay of the triggering of a command.

Thus, if the second electronic apparatus is sporadically in inactive mode, the autonomous management method will not inopportunely trigger an inappropriate "standby" command for the first electronic apparatus due to the sporadic remoteness of the user of this second electronic apparatus which he desires to continue to use with the first electronic apparatus.

Advantageously, according to an implementation of the invention, the various steps of the method according to the invention are implemented by software or computer program, this software comprising software instructions intended to be executed by a data processor of a device forming part of the first electronic apparatus and being designed to control the execution of the various steps of this method.

The invention is therefore also aimed at a program comprising program code instructions for the execution of the steps of the autonomous management method when said program is executed by a processor.

This program can use any programming language and be in the form of source code, object code or code intermediate between source code and object code such as in a partially compiled form or in any other desirable form.

Another subject of the invention is a device for autonomous management of a first electronic apparatus. The first electronic apparatus is connected to a second electronic apparatus in such a way that said first electronic apparatus provides the second electronic apparatus with data able to be used by said second electronic apparatus. The autonomous management device comprises a trigger of command means for controlling said first electronic apparatus as a function of activity data of the second electronic apparatus.

A subject of the invention is further a first electronic apparatus connected to a second electronic apparatus in such a way that said first electronic apparatus provides the second electronic apparatus with data able to be used by said second electronic apparatus. The first electronic apparatus comprises a trigger of command means for controlling said first electronic apparatus as a function of activity data of the second electronic apparatus.

Advantageously, the first electronic apparatus consists of a multimedia apparatus and the second electronic apparatus a reproduction apparatus.

Advantageously, the first electronic apparatus is connected to the second electronic apparatus by an HDMI interface able to allow a detection of an activity of said second electronic apparatus by said first electronic apparatus.

BRIEF DESCRIPTION OF THE DRAWINGS

The characteristics and advantages of the invention will be more clearly apparent on reading the description, given by way of example, and figures relating thereto which represent.

DETAILED DESCRIPTION

The expression autonomous management of a first electronic apparatus is understood as referring to management not requiring the active intervention of another apparatus notably of a second electronic apparatus connected to the first electronic apparatus.

The expressions first electronic apparatus and second electronic apparatus are understood as referring to any electronic apparatus that can be connected to one or more other electronic apparatuses. The first electronic apparatus is able to provide at least one second electronic apparatus with data able to be used by this second electronic apparatus. The second electronic apparatus is therefore able to receive data from a first electronic apparatus and to use these data. In the audiovisual field, the first electronics is notably a decoder, a "Set Top Box", a DVD, CD, DVD-Rom, Hard Disk, Blue-Ray, etc. reader, an amplifier, etc. and the second electronic apparatus is notably a multimedia reproduction apparatus: a television, a Hi-fi deck; a recorder for CD, DVD, hard disk; an amplifier (if the first electronic apparatus is a decoder for example), etc. In the computing field, a modem or a domestic gateway can be a first electronic apparatus and a computer, a Smartphone, a television connected directly to the Internet can be a second electronic apparatus.

The expression command of a first electronic apparatus is understood as referring to a message able to make it possible to control at least one activity of the first electronic apparatus.

The expression activities data of an electronic apparatus is understood as referring to data comprising at least one item of information indicating that the electronic apparatus is "active" and/or "inactive" and/or in "standby" mode and/or in "partial standby" mode and/or in "shutdown" mode. Furthermore, in the case where the electronic apparatus is "active" or in "partial standby" mode, the activities data can comprises data relating to the type, respectively of activity or of partial standby.

The expression functional means of an electronic apparatus is understood as referring to all the means of said apparatus making it possible to implement a function other than the power supply and the control of the electronic apparatus.

Figure 1:
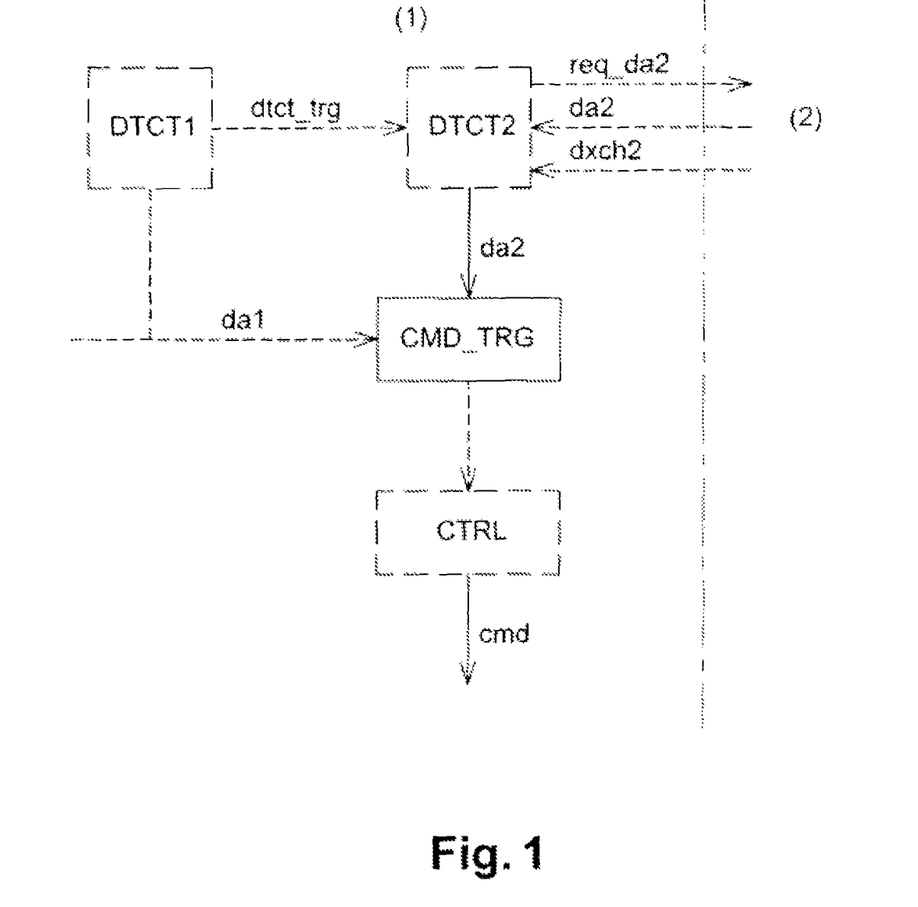
FIG. 1, a simplified diagram of an autonomous management method according to the invention, FIG. 2, a simplified diagram of exchanges within the first electronic apparatus during the implementation of an autonomous management method according to the invention, FIG. 3, a simplified diagram of an architecture comprising a first electronic apparatus according to the invention.

FIG. 1 illustrates a simplified diagram of an autonomous management method according to the invention.

The autonomous management method allows the management of a first electronic apparatus 1 by itself. The first electronic apparatus 1 is connected to at least one second electronic apparatus 2 in such a way that said first electronic apparatus 1 provides the second electronic apparatus 2 with data du able to be used by said second electronic apparatus 2.

The autonomous management method comprises a triggering CMD_TRG by said first electronic apparatus 1 of a command cmd of said first electronic apparatus 1 as a function of activity data da2 of at least one second electronic apparatus 2 from among the at least one second electronic apparatus 2.

In particular, the autonomous management method comprises a detection DTCT2 of an activity of said second electronic apparatus 2 by said first electronic apparatus 1. The detection DTCT2 of an activity of said second electronic apparatus 2 by said first electronic apparatus 1 then provides the activities data da2 as a function of which a command cmd is triggered CMD_TRG.

Notably, the detection of an activity DTCT2 of said second electronic apparatus 2 by said first electronic apparatus 1 comprises at least one request for statuses req_da2 from the first electronic apparatus 1 to the second electronic apparatus 2. The request for statuses req_da2 is able to trigger a response of the second electronic apparatus 2 to the first electronic apparatus 1 comprising activity data da2 of the second electronic apparatus 2.

An alternative of the activity detection comprises the analysis of the exchanges and/or of the data exchanged dxch2 between the first electronic apparatus 1 and the second electronic apparatus 2, notably received from the second electronic apparatus 2 by the first electronic apparatus 1. For example, in the case where a decoder no longer exchanges data with a television, the detection DTCT2 will produce activity data of the television indicating "inactive", or more precisely "inactive decoder source use".

In particular, the detection of an activity DTCT2 of the second electronic apparatus 2 is triggered dtct_trg by a detection of an activity of the first electronic apparatus 1. For example, an inactivity of the first electronic apparatus 1 or an activity of providing data will trigger from the first electronic apparatus 1 to the second electronic apparatus 2 the detection of an activity DTCT2 of the second electronic apparatus 2 notably so as to verify whether the second electronic apparatus 2 is active or inactive. For its part an activity of updating the first electronic apparatus will not trigger detection of an activity DTC2 of the second electronic apparatus.

In particular, the triggering CMD_TRG is also dependent on activity data da1 of the first electronic apparatus 1, notably produced by a detection DTCT1 of an activity of the first electronic apparatus 1.

In particular, the command cmd is a command for shutting down at least functional means of said first electronic apparatus 1.

In particular, the autonomous management method comprises a control CTRL of the first electronic apparatus 1 which receives an instruction of the triggering CMD_TRG able to allow the implementation of a command cmd.

In a particular embodiment, the autonomous management method is implemented by a program comprising program code instructions for the execution of the steps of the autonomous management method when said program is executed by a processor.

The invention is also aimed at an information medium. The information medium can be any entity or device capable of storing the autonomous management program. For example, the medium can comprise a storage means, such as a ROM, for example a CD ROM or a microelectronic circuit ROM or else a magnetic recording means, for example a diskette or a hard disk.

Moreover, the information medium can be a transmissible medium such as an electrical or optical signal which can be conveyed via an electrical or optical cable, by radio or by other means. The program according to the invention can be in particular downloaded on a network notably of Internet type.

Alternatively, the information medium can be an integrated circuit into which the program is incorporated, the circuit being adapted to execute or to be used in the execution of the method in question.

In another implementation, the invention is implemented by means of software and/or hardware components. In this regard the term module can correspond equally well to a software component or to a hardware component. A software component corresponds to one or more computer programs, one or more subroutines of a program, or in a more general manner to any element of a program or of a piece of software able to implement a function or a set of functions according to the description hereinbelow. A hardware component corresponds to any element of a hardware set able to implement a function or a set of functions.

Figure 2:
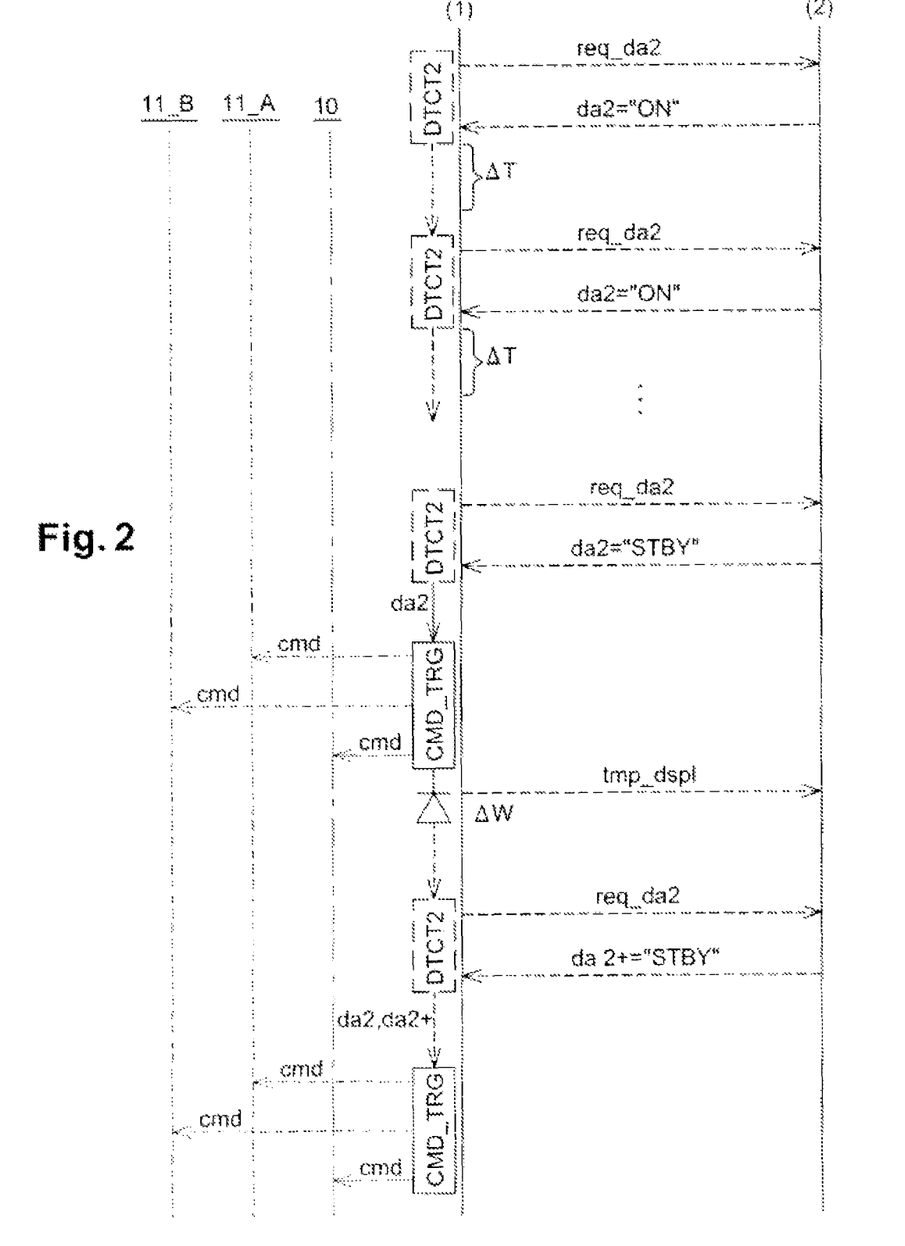

FIG. 2 illustrates a simplified diagram of exchanges within the first electronic apparatus 1 during the implementation of an autonomous management method according to the invention.

A first electronic apparatus 1 comprises several means: functional means 11_A, optionally 11_B, and optionally power supply means 10, notably a battery or a linkup to an exterior power supply such as a mains power supply.

The autonomous management method comprises at least one triggering CMD_TRG by the first electronic apparatus 1 of a command of said first electronic apparatus 1, notably of at least functional means 11_A of said first electronic apparatus 1 as a function of activity data da2 of a second electronic apparatus 2 connected to the first electronic apparatus 1.

In particular, the autonomous management method comprises a detection of an activity DTCT2 of the second electronic apparatus 2 able to make it possible to provide the activity data da2 to the triggering CMD_TRG.

Notably, the detection of an activity DTCT2 of said second electronic apparatus 2 by said first electronic apparatus 1 comprises at least one request for statuses req_da2 from the first electronic apparatus 1 to the second electronic apparatus 2. The request for statuses req_da2 is able to trigger a response of the second electronic apparatus 2 to the first electronic apparatus 1 comprising activity data da2 of the second electronic apparatus 2. For example, the second electronic apparatus 2 will indicate to the first electronic apparatus 1 that it is turned on by returning the activity datum da2 ="ON" or that it is on standby by returning the activity datum da2 ="STBY".

In particular, the autonomous management method comprises a periodic renewal of said detection of an activity DTCT2 of the second electronic apparatus 2. The detection DTCT2 is then renewed at the end of each period of duration Δt. The period Δt is notably predefined, for example as a function of a type of activity to be detected and/or in an optimal manner so as not to overload the interface between the first electronic apparatus 1 and the second electronic apparatus 2, and/or the second electronic apparatus 2 and/or the first electronic apparatus 1.

In the example illustrated by FIG. 2, the detection DTCT2 providing an activity datum da2="ON" is renewed for example every minute.

When the detection DTCT2 provides an activity datum da2="STBY" this may optionally immediately trigger a command CMD_TRG of the functional means 11_A and optionally 11_B, for placement on standby and optionally of the power supply means 10 for complete shutdown of the first electronic apparatus 11.

In an alternative manner, when the detection DTCT2 provides an activity datum da2 ="STBY" this may optionally directly trigger a time delay command. The time delay makes it possible to postpone by a period ΔW the triggering CMD_TRG of a command CMD_TRG of the functional means 11_A and optionally 11_B, for a placement on standby and optionally of the power supply means 10 for complete shutdown of the first electronic apparatus 11. In particular, the time delay can comprise the dispatching by the first electronic apparatus 1 of data reproducible by the second electronic apparatus 2 comprising an information message about the time delay tmp_dspl, for example the "Set Top Box" 1 dispatches multimedia data to a television 2 such that the reproduction of the multimedia data allows the display on a screen of the television 2 of a message destined for the user of the television that the "Set Top Box" will place itself on standby in a time interval ΔW (this message can envisage some time delay period).

In particular, at the end of the time delay, the method can furthermore comprise a last detection of an activity DTCT2 of the second electronic apparatus 2 so as to verify whether the current activity data da2+are identical to those da2 that triggered the time-delayed command.

Figure 3:
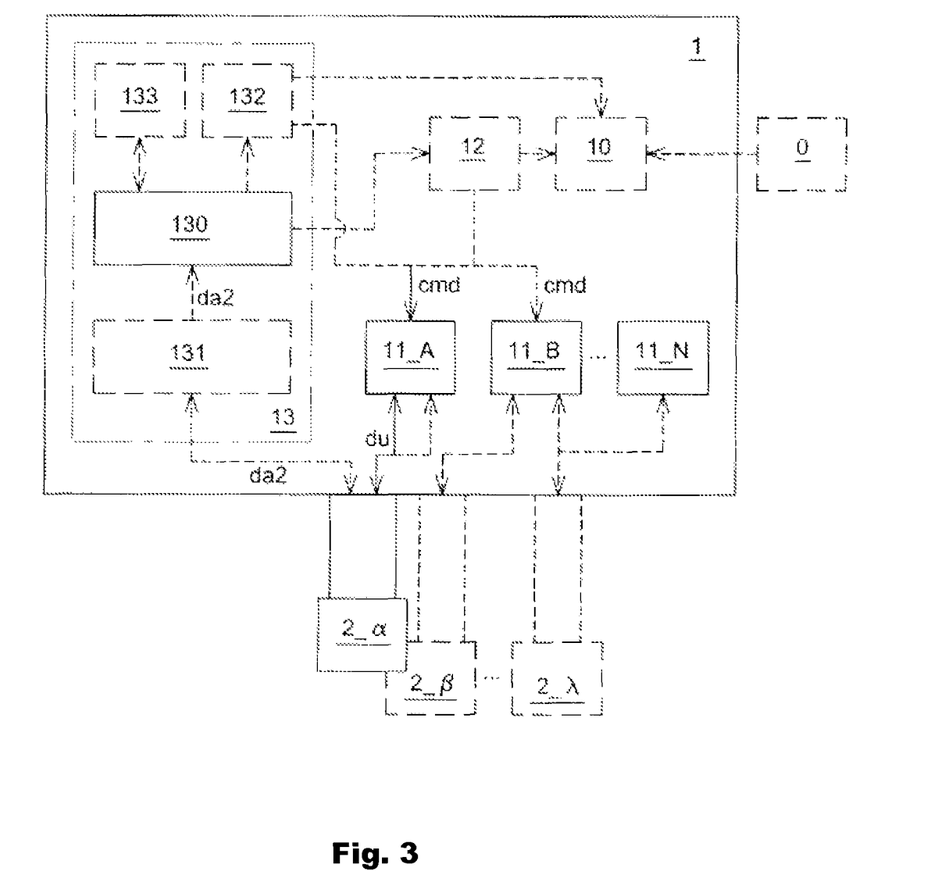

FIG. 3 illustrates a simplified diagram of an architecture comprising a first electronic apparatus 1 according to the invention. The first electronic apparatus 1 is connected to a second electronic apparatus 2 in such a way that said first electronic apparatus 1 provides the second electronic apparatus 2 with data du able to be used by said second electronic apparatus 2.

FIG. 3 shows a first electronic apparatus 1 comprising notably an autonomous management device 1 according to the invention. The autonomous management device 13 comprises a trigger 130 of command means 132, 12 for controlling said first electronic apparatus 1 as a function of activity data da2 of the second electronic apparatus 2.

In particular, the autonomous management device 1 comprises an activity detector 131 for at least one second electronic apparatus 2_α, 2_β, . . . , 2_λ. The activity detector 131 provides the trigger 130 with data of an activity da2 of said second electronic apparatus 2_α.

In particular, the autonomous management device 13 comprises a timer 133 able to time the control trigger 130. The timer 133 may optionally be integrated into the control trigger 130. Thus, notably, the detector 131 dispatches activities data da2 to the trigger 130 which determines these activities data da2 are able to trigger a command by virtue of the trigger 130. The trigger 130 dispatches its instructions to the timer 133 which either transmits them directly to a controller for execution, or returns them to the trigger 130 for confirmation before transmission to a controller for execution.

In particular, the autonomous management device comprises a controller 132 able to control as a function of an instruction of the trigger 130 at least one of the functional means 11_A, 11_B, . . . , 11_N of the first electronic apparatus 1, and optionally power supply means 10. In an alternative manner, the first electronic apparatus 1 comprises a controller 132 able to control at least one of the functional means 11_A, 11_B, . . . , 11_N of the first electronic apparatus 1, and optionally power supply means 10 as a function of a command of a user interface (not illustrated) of the first electronic apparatus 1 or of an instruction of the trigger 130.

FIG. 3 shows a first electronic apparatus 1 comprising a trigger 130 of command means 132, 12 for controlling said first electronic apparatus 1 as a function of activity data da2 of the second electronic apparatus 2.

In particular, the first electronic apparatus 1 comprises an activity detector 131 for at least one second electronic apparatus 2_α, 2_β, . . . , 2_λ. The activity detector 131 provides the trigger 130 with activity data da2 of said second electronic apparatus 2_α.

In particular, the first electronic apparatus 1 comprises a timer 133 able to time the control trigger 130.

In particular, the first electronic apparatus 1 comprises a controller 132 able to control at least one of the functional means 11_A, 11_B, . . . , 11_N of the first electronic apparatus 1, and optionally power supply means 1 as a function of a command of a user interface (not illustrated) of the first electronic apparatus 1 or of an instruction of the trigger 130.

In particular, the first electronic apparatus 1 consists of a multimedia apparatus and the second electronic apparatus 2 a reproduction apparatus.

In particular, the first electronic apparatus 1 is connected to the second electronic apparatus 2 by an HDMI interface (not illustrated) able to allow a detection DTCT2 of an activity of said second electronic apparatus 2 by said first electronic apparatus 1, for example a "Power Status" activity datum allowing the first electronic apparatus 1 to detect powered second electronic apparatus 2 and the placement on standby of the second electronic apparatus 2.

Thus, a use of the invention allows a decoder, modem, gateway, "Set Top Box", audio amplifier, etc. to be placed on standby or shut down autonomously when the television, the computer, the Hi-fi deck, etc. to which it is connected is shut down or placed on standby automatically or on request of the user.

This use of the invention makes it possible to reduce the energy consumption of the first electronic apparatus, but also of the servers when these first apparatuses operate in conjunction with servers.

This use of the invention furthermore makes it possible to reduce passband consumption when the first apparatus is connected to a communication network.

The invention claimed is:

1. A method for managing a multimedia providing apparatus, the multimedia providing apparatus comprising a functional device that in operation provides multimedia data to a multimedia production apparatus for use by the multimedia reproduction apparatus and a management device, wherein the multimedia providing apparatus and the multimedia reproduction apparatus are locally connected, the method, carried out by the management device, comprising:
   transmitting, from the management device of the multimedia providing apparatus to the multimedia reproduction apparatus, a request for the status of the multimedia reproduction apparatus;
   receiving, at the management device of the multimedia providing apparatus from the multimedia reproduction apparatus in response to the request, data indicating the activity status of the multimedia reproduction apparatus; and
   changing, by the management device, the activity state of the functional device of the multimedia providing apparatus based on the activity status indicated by the received data.

2. The method of claim 1, wherein
   receiving data indicating the activity status of the multimedia reproduction apparatus comprises receiving data indicating that the multimedia reproduction apparatus is in standby or inactive mode, and
   changing the activity state of the functional device of the multimedia providing apparatus comprises changing the activity state of the functional device to a standby mode.

3. The method of claim 1, wherein
   receiving data indicating the activity status of the multimedia reproduction apparatus comprises receiving data indicating that the multimedia reproduction apparatus is in standby or inactive mode,
   changing the activity state comprises changing the activity state of the functional device to a standby mode after a predetermined time delay.

4. The method of claim 1, wherein the multimedia providing apparatus is a multimedia apparatus and the multimedia reproduction apparatus is a reproduction apparatus.

5. The method of claim 1, wherein the multimedia providing apparatus is a set-top box and the multimedia reproduction apparatus is a television.

6. The method of claim 1, wherein the multimedia providing apparatus is a video player and the multimedia reproduction apparatus is a television.

7. The method of claim 1, wherein the multimedia providing apparatus is a set-top box and the multimedia reproduction apparatus is a video player.

8. A device comprising a first functional electronic apparatus operative to deliver multimedia data and a connection via which a multimedia providing apparatus provides the multimedia data usable by a multimedia reproduction apparatus, wherein the device comprises a management device configured to carry out actions comprising:
   transmitting, to the multimedia reproduction apparatus, a request for the status of the multimedia reproduction apparatus;
   receiving, from the multimedia reproduction apparatus in response to the request, data indicating the activity status of the multimedia reproduction apparatus; and
   changing the activity state of the first functional electronic apparatus based on the activity status indicated by the received data,
   wherein the multimedia providing apparatus and the multimedia reproduction apparatus are locally connected.

9. The device of claim 8, wherein
   receiving data indicating the activity status of the multimedia reproduction apparatus comprises receiving data indicating that the multimedia reproduction apparatus is in standby or inactive mode, and
   changing the activity state of the first functional electronic apparatus comprises changing the activity state of the first functional electronic apparatus to a standby mode.

10. The device of claim 8, wherein
    receiving data indicating the activity status of the multimedia reproduction apparatus comprises receiving data indicating that the multimedia reproduction apparatus is in standby or inactive mode,
    changing the activity state of the first functional electronic apparatus comprises changing the activity state of the first functional electronic apparatus to a standby mode after a predetermined time delay.

11. The device of claim 8, wherein the first functional electronic apparatus is a multimedia apparatus.

12. The device of claim 8, wherein the multimedia providing apparatus is a set-top box and the multimedia reproduction is a television.

13. The device of claim 8, wherein the first functional electronic apparatus is a video player and the multimedia reproduction apparatus is a television.

14. The device of claim 8, wherein the first functional electronic apparatus is a set-top box and the multimedia reproduction apparatus is a video player.

15. A multimedia providing apparatus connected to a multimedia reproduction apparatus in such a way that a first functional apparatus of the multimedia providing apparatus provides the multimedia reproduction apparatus with audio or visual data able to be output by the multimedia reproduction apparatus, wherein a management device of the first electronic apparatus carries out actions comprising:
    receiving, from the multimedia reproduction apparatus, data indicating that the multimedia reproduction apparatus is in an inactive state; and
    shutting down a function of the first functional apparatus in response to receiving the data,
    wherein the multimedia providing apparatus and the multimedia reproduction apparatus are locally connected.

16. The multimedia providing apparatus of claim 15, wherein shutting down a function of the first functional apparatus comprises putting the first functional apparatus in a standby mode.

17. The multimedia providing apparatus of claim 15, wherein the first functional apparatus is a multimedia apparatus.

18. The multimedia providing apparatus of claim 15, wherein the first functional apparatus is a set-top box and the multimedia reproduction apparatus is a television.

19. The multimedia providing apparatus of claim 15, wherein the first functional apparatus is a video player and the multimedia reproduction apparatus is a television.

20. The multimedia providing apparatus of claim 15, wherein the first functional apparatus is a set-top box and the multimedia reproduction apparatus is a video player.

* * * * *